(12) United States Patent
    Komiyama

(10) Patent No.: US 11,483,524 B2
(45) Date of Patent: Oct. 25, 2022

(54) INFORMATION PROCESSING SYSTEM, CLIENT DEVICE, INFORMATION PROCESSING METHOD, PROGRAM, AND STORAGE MEDIUM

(71) Applicant: NS Solutions Corporation, Tokyo (JP)

(72) Inventor: Masakazu Komiyama, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 17/269,474

(22) PCT Filed: Sep. 11, 2019

(86) PCT No.: PCT/JP2019/035610
    § 371 (c)(1),
    (2) Date: Feb. 18, 2021

(87) PCT Pub. No.: WO2020/054744
    PCT Pub. Date: Mar. 19, 2020

(65) Prior Publication Data
    US 2021/0314534 A1    Oct. 7, 2021

(30) Foreign Application Priority Data

Sep. 12, 2018  (JP) .............................. JP2018-170387

(51) Int. Cl.
    *H04N 7/18*      (2006.01)
    *G06T 7/60*      (2017.01)
    (Continued)

(52) U.S. Cl.
    CPC ........... *H04N 7/183* (2013.01); *B65G 1/1375* (2013.01); *G06T 7/60* (2013.01); *G06V 20/56* (2022.01);
    (Continued)

(58) Field of Classification Search
    None
    See application file for complete search history.

(56) References Cited

U.S. PATENT DOCUMENTS

2012/0321130 A1* 12/2012 Osman .................... H04N 5/76
                                                    382/103
2017/0255899 A1*  9/2017 Taira .................... G06Q 10/087
    (Continued)

FOREIGN PATENT DOCUMENTS

JP        2003-12122 A      1/2003
JP        2004-210431 A     7/2004
    (Continued)

OTHER PUBLICATIONS

International Search Report, issued by International Searching Authority in corresponding International Application No. PCT/JP2019/035610, dated Nov. 26, 2019.
    (Continued)

*Primary Examiner* — Samuel D Fereja
(74) *Attorney, Agent, or Firm* — ArentFox Schiff LLP

(57) ABSTRACT

An information processing system includes a client device provided in a moving body and a server device. The client device includes a photographing controller configured to control a photographing unit provided in the moving body to continuously perform photographing and a first transmitter configured to transmit information on a marker photographed in a photographed image to the server device when a size of a marker photographed in the photographed image photographed by the photographing unit is determined to have varied to cross a predetermined threshold value. The server device includes a first storage controller configured to control a storage unit to store the information on the marker transmitted by the first transmitter.

7 Claims, 10 Drawing Sheets

(51) Int. Cl.
    *B65G 1/137*     (2006.01)
    *G06V 20/56*     (2022.01)

(52) U.S. Cl.
    CPC ............... *G06T 2207/30204* (2013.01); *G06T 2207/30252* (2013.01)

(56) References Cited

U.S. PATENT DOCUMENTS

| | | | |
|---|---|---|---|
| 2019/0108605 A1 | 4/2019 | Komiyama | |
| 2019/0156086 A1* | 5/2019 | Plummer | ............. G06K 7/1413 |
| 2019/0370567 A1* | 12/2019 | Eckman | .................... G01S 3/00 |
| 2020/0074676 A1* | 3/2020 | Nomasa | ................... G06T 7/74 |

FOREIGN PATENT DOCUMENTS

| | | |
|---|---|---|
| JP | 2005-70725 A | 3/2005 |
| JP | 2006-103857 A | 4/2006 |
| JP | 2009-120380 A | 6/2009 |
| JP | 2010-145199 A | 7/2010 |
| JP | 2015-84139 A | 4/2015 |
| JP | 2018-2331 A | 1/2018 |
| JP | 2018-127298 A | 8/2018 |

OTHER PUBLICATIONS

Communication dated May 31, 2022, from the Canadian Intellectual Property Office in counterpart application No. 3,110,037.

* cited by examiner

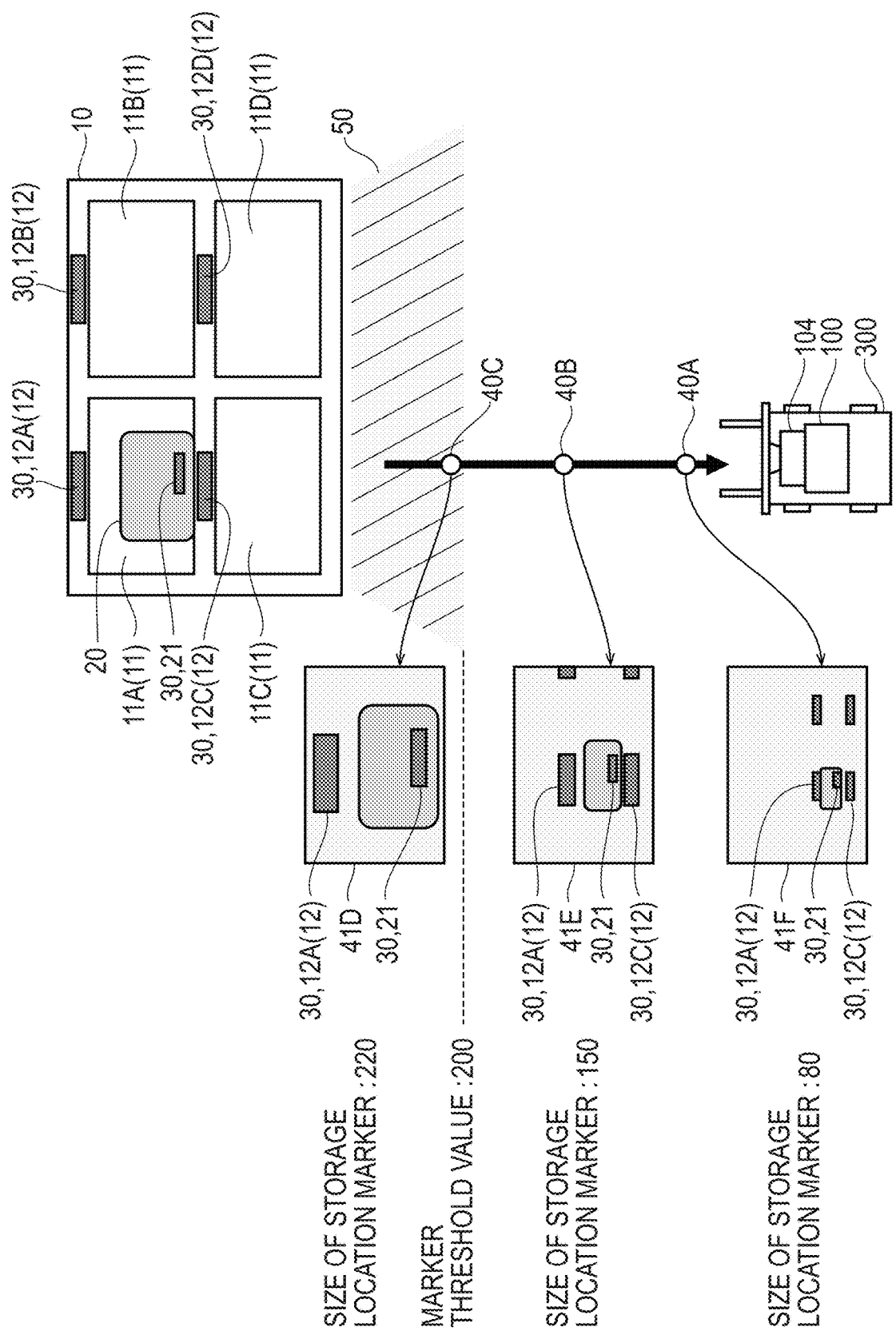

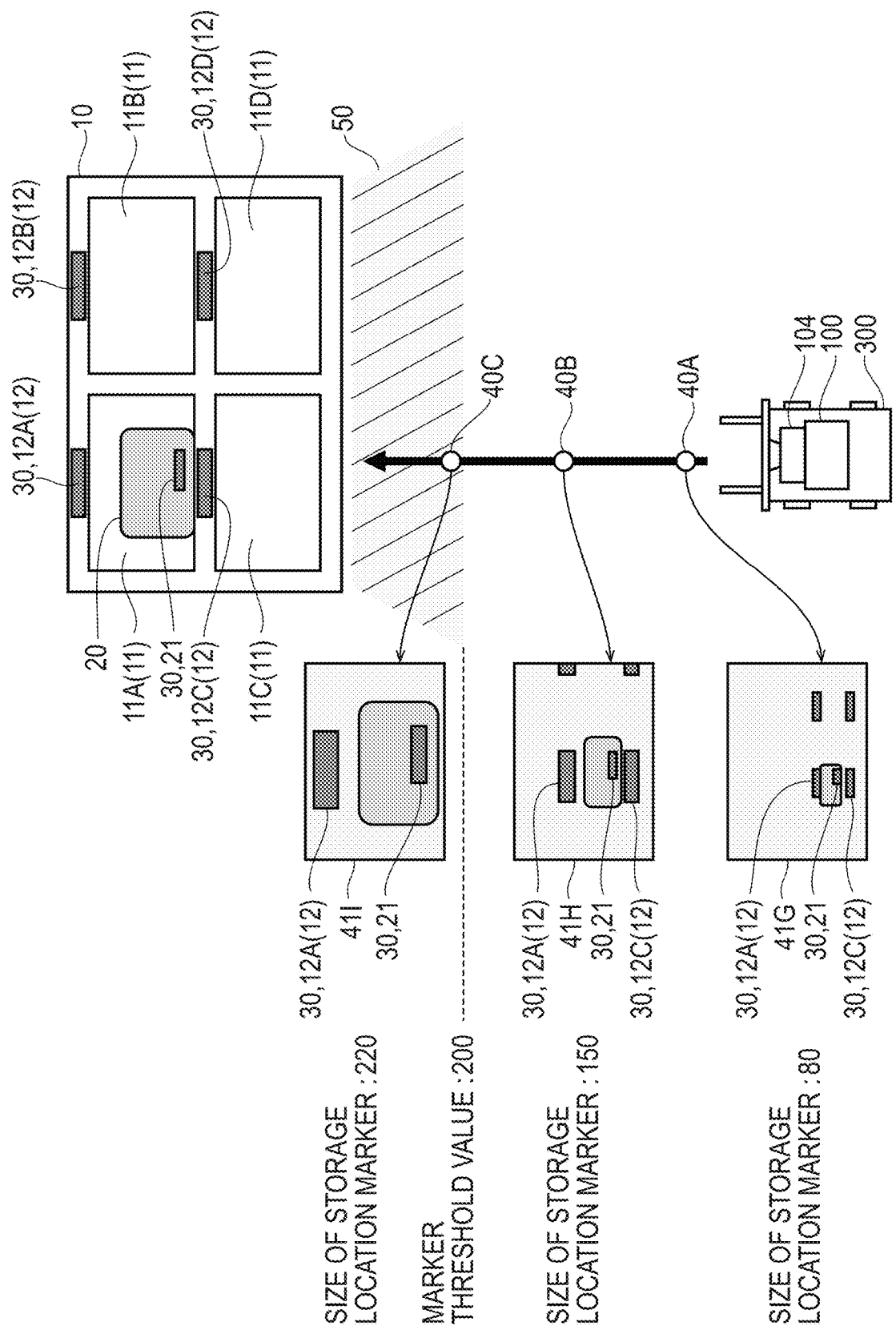

INFORMATION PROCESSING SYSTEM, CLIENT DEVICE, INFORMATION PROCESSING METHOD, PROGRAM, AND STORAGE MEDIUM

CROSS-REFERENCE TO RELATED APPLICATIONS

The present application is a National Stage entry of International Application No. PCT/JP2019/035610, filed on Sep. 11, 2019, which claims priority to Japanese Patent Application No. 2018-170387, filed Sep. 12, 2018. The disclosures of the prior applications are incorporated herein by reference in their entirety.

TECHNICAL FIELD

The present invention relates to an information processing system, a client device, an information processing method, a program, and a storage medium.

BACKGROUND ART

A storage/retrieval control system of Patent Literature 1 takes a photograph that includes a brand of a luggage and a photograph that includes a forklift ID when the forklift loading a pallet loading the luggage enters a warehouse. Then the storage/retrieval control system takes a photograph that includes a location ID and the forklift ID when the forklift places the pallet to a predetermined location. Then, based on a forklift ID in the photograph, the storage/retrieval control system collates the brand of the luggage and the location ID in the photograph with storage/retrieval information to determine whether a luggage corresponding to the storage/retrieval information is placed at a location corresponding to the storage/retrieval information or not.

CITATION LIST

Patent Literature

Patent Literature 1: Japanese Laid-open Patent Publication No. 2003-12122

SUMMARY OF INVENTION

Technical Problem

However, in the storage/retrieval control system of Patent Literature 1, for example, a sensor for detecting that the forklift has placed the pallets at the predetermined location is needed, and thus work for installation of, for example, the sensor and maintenance of, for example, the sensor is complicated.

When a photographing unit provided in a moving body such as a forklift photographs, for example, an article with a marker attached and a shelf to read out the marker and transmits the information that has been read out to a server device, a communication amount between the photographing unit and the server device increases while a communication speed decreases.

Solution to Problem

An information processing system of the present invention includes a client device provided in a moving body and a server device. The client device includes a photographing controller configured to control a photographing unit provided in the moving body to continuously perform photographing and a first transmitter configured to transmit information on a marker photographed in a photographed image to the server device when a size of a marker photographed in the photographed image photographed by the photographing unit is determined to have varied to cross a predetermined threshold value. The server device includes a first storage controller configured to control a storage unit to store the information on the marker transmitted by the first transmitter.

Advantageous Effects of Invention

According to the present invention, complicated work can be avoided and the communication amount can be reduced.

BRIEF DESCRIPTION OF DRAWINGS

FIG. 4B is a drawing illustrating an operation example of the client device.
FIG. 4C is a drawing illustrating an operation example of the client device.

DESCRIPTION OF EMBODIMENTS

First Embodiment

Overall Configuration of Article Management System

Figure 1:
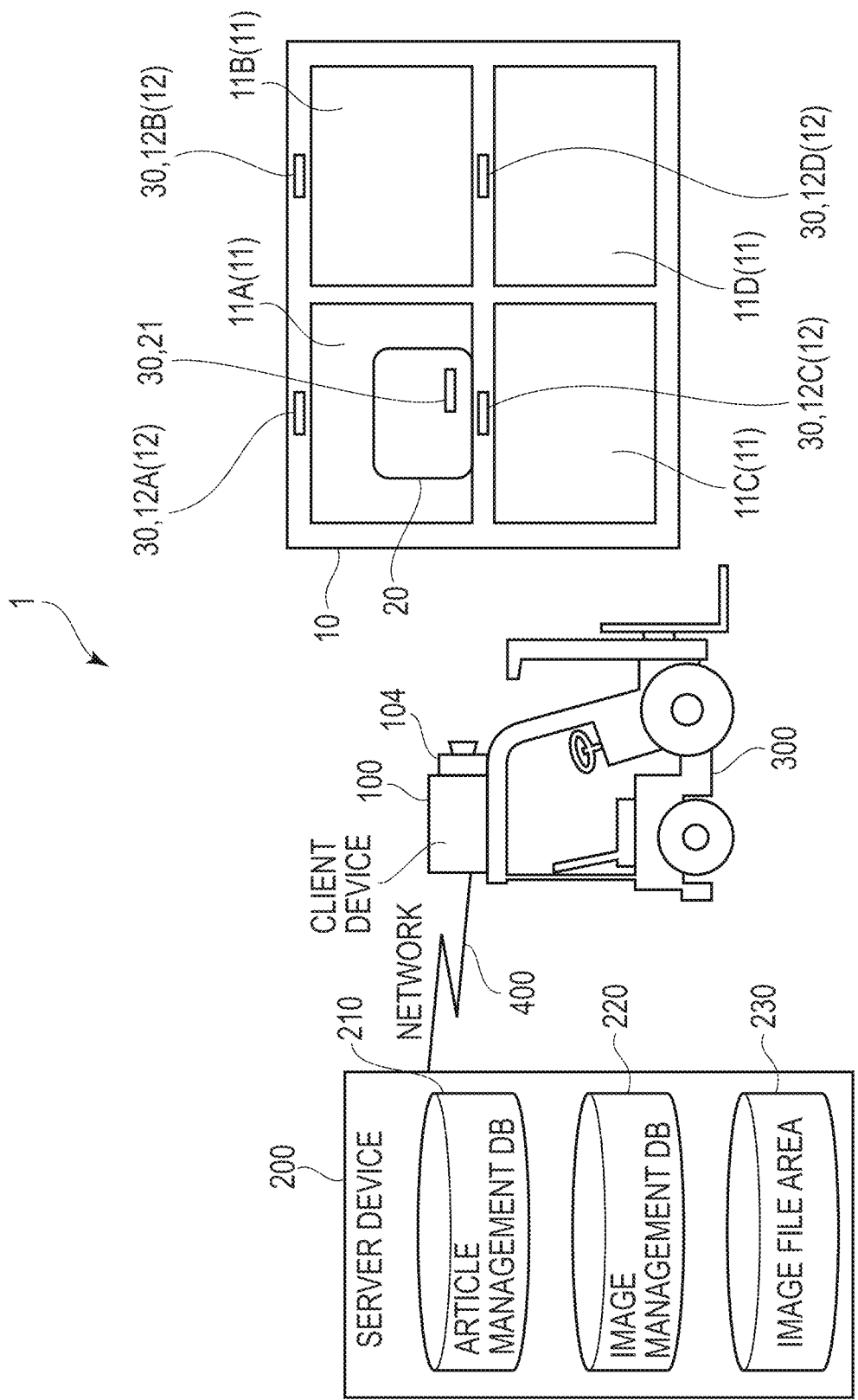
FIG. 1 is a drawing illustrating one example of an overall configuration of an article management system.

The overall configuration of an article management system 1 will be described with reference to FIG. 1. FIG. 1 is a drawing illustrating one example of the overall configuration of the article management system 1. The article management system 1 manages an article 20 that is stored in a shelf 10 located in, for example, a warehouse. The article management system 1 has a forklift 300, a client device 100, and a server device 200. The article management system 1 is one example of an information processing system.

The forklift 300 conveys the article 20. In this embodiment, article management system 1 has one forklift 300 and may have a plurality of the forklifts 300. The forklift 300 is one example of a movable moving body.

The client device 100 is a photographing unit that is provided in the forklift 300 and is continuously photographing while moving together with the forklift 300. The client device 100 can transmit and receive data to and from the server device 200 via a network 400. As the network 400, a wireless communication network is used. However, As the network 400, a wired communication network may be used. The client device 100 is mounted to the forklift 300 so as to be able to photograph the front of the forklift 300.

The server device 200 receives data from the client device 100 via the network 400 to manage an article management DB 210 (a database), an image management DB 220, and an image file area 230, which will be described later, based on the received data. The database is a collection of predetermined information.

The client device 100 and the server device 200 each are one example of an information processing apparatus (a computer).

The client device 100 sequentially and continuously photographs, for example, the shelf 10 and the article 20 while moving together with the forklift 300. The shelf 10 has one or more storage spaces 11. The storage space 11 is a storage location of the article 20. The front of the storage space 11 is opened. Each storage space 11 can store one or more articles 20. In the example of FIG. 1, the shelf 10 has four storage spaces 11, which is from a first storage space 11A to a fourth storage space 11D.

Marker

Next, a marker 30 will be described.

The marker 30 is attached to the shelf 10 and the article 20. The marker 30 is an optical reading type and predetermined information is stored for each marker 30. The marker 30 includes a storage location marker 12 and an article marker 21. The marker 30 has a quadrangular shape such as a square or a rectangle.

The storage location marker 12 is associated with the storage space 11. The storage location marker 12 associated with the storage space 11 is present for each storage space 11. In the storage location marker 12, a storage location ID that represents the corresponding storage space 11 is stored. The storage location ID is an identifier that can identify the storage space 11. In this embodiment, the storage location marker 12 is attached on a front surface of a shelf board located on an upper side of the corresponding storage space 11. A first storage location marker 12A corresponds to the first storage space 11A. Similarly, a second storage location marker 12B to a fourth storage location marker 12D each correspond to a second storage space 11B to the fourth storage space 11D. The storage location marker 12 is larger than the article marker 21.

The article marker 21 is associated with the article 20. For each article 20, the article marker 21 associated with the article 20 is present. For the article marker 21, an article ID that represents the corresponding article 20 is stored. The article ID is an identifier that can identify the article 20. The article marker 21 is attached on a front surface of the article 20. In this embodiment, an operator or the like inside the warehouse stores the article 20 in the storage space 11 such that the article marker 21 attached to the article 20 faces the front surface of the shelf 10. The article marker 21 may be attached not only to the front surface of the article 20 but also, for example, to an upper surface or side surface of the article 20. When it is possible to photograph with an image sensor 104 described later, the operator or the like inside the warehouse may store the article 20 in the storage space 11 such that the article marker 21 attached to the article 20 faces a direction other than the front surface of the shelf 10.

The kinds of marker 30 include, for example, a QR code (registered trademark), color bits (registered trademark), a bar code. As the marker 30, a two-dimensional code such as a QR code or color bits may be used and a one-dimensional code such as a bar code may be used.

By photographing the shelf 10, the client device 100 reads out the storage location marker 12 attached to the shelf 10 and the article marker 21 attached to the article 20 stored in the shelf 10. In this embodiment, the client device 100 reads out only one kind of marker 30. For example, the client device 100 reads out only the color bit marker 30. However, when a plurality of kinds of marker 30 are used, the client device 100 may read out the plurality of kinds of marker 30.

Hardware Configuration

Figure 2A:
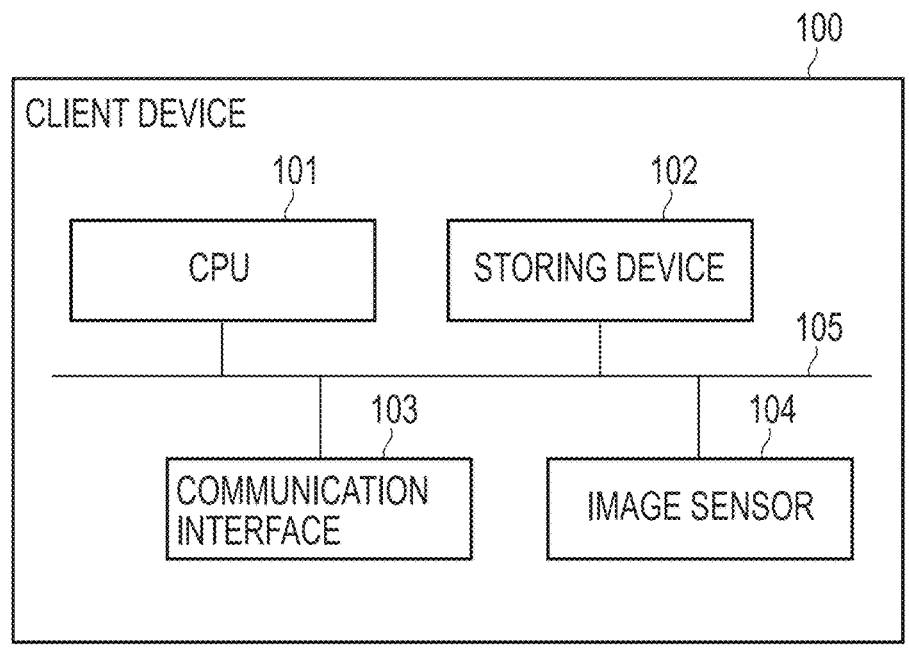
FIG. 2A is a drawing illustrating one example of a hardware configuration of a client device.

Next, the hardware configuration of the client device 100 will be described with reference to FIG. 2A. FIG. 2A is a drawing illustrating one example of the hardware configuration of the client device 100. The client device 100 includes a CPU 101, a storing device 102, a communication interface 103, the image sensor 104, and a bus 105 that couples them, as hardware.

The CPU 101 controls the entire client device 100. Executing processes by the CPU 101 based on programs stored in, for example, the storing device 102 achieves various functions of the client device 100 and the processes of flowcharts illustrated in FIG. 5, FIG. 6, and FIG. 7.

The storing device 102 is, for example, a RAM, a ROM, or an HDD and stores the programs and stores, for example, data that the CPU 101 uses when executing the processes based on the programs. The storing device 102 is one example of a storage medium.

The communication interface 103 manages controlling the communication between the client device 100 and an external device such as the server device 200.

The image sensor 104 is used when the client device 100 photographs. The image sensor 104 generates a digital image to be a photographed image based on light passing through a lens. The image sensor 104 is provided in the forklift 300 together with the client device 100. The image sensor 104 is one example of a photographing unit.

Figure 2B:
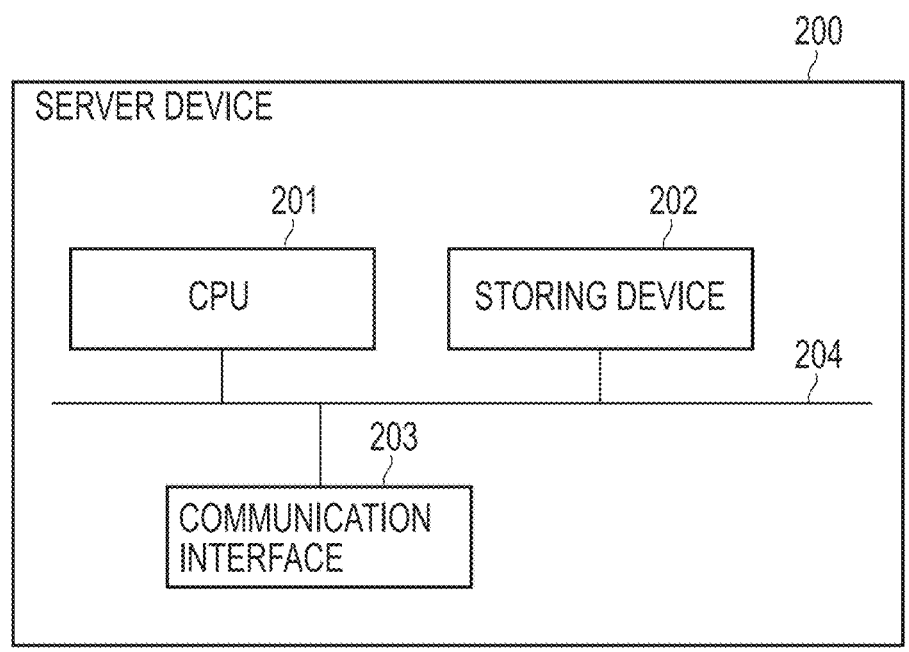
FIG. 2B is a drawing illustrating one example of a hardware configuration of a server device.

Next, the hardware configuration of the server device 200 will be described with reference to FIG. 2B. FIG. 2B is a drawing illustrating one example of the hardware configuration of the server device 200. The server device 200 includes a CPU 201, a storing device 202, a communication interface 203, and a bus 204 that couples them, as hardware.

The CPU 201 controls the entire server device 200. Executing processes by the CPU 201 based on programs stored in, for example, the storing device 202 achieves various functions and processes of the server device 200.

The storing device 202 is, for example, a RAM, a ROM, or an HDD and stores the programs and stores, for example, data that the CPU 201 uses when executing the processes based on the programs. The storing device 202 has the article management DB 210, the image management DB 220, and the image file area 230, which will be described later, in a storing area. The storing device 202 is one example of a storage medium. The storing device 202 is one example of a storing unit.

The communication interface 203 manages controlling the communication between the server device 200 and an external device such as the client device 100.

Operation Example

Next, the operation example of the client device 100 will be described with reference to FIG. 4A to FIG. 4D. FIG. 4A to FIG. 4D are drawings illustrating the operation example of the client device 100. In a photographed image 41A to a photographed image 41L in FIG. 4A to FIG. 4D, the shelf 10 is omitted.

The CPU 101 of the client device 100 controls the image sensor 104 so as to continuously perform photographing. When a size of the marker 30 photographed in the photographed image has varied from less than a marker threshold value to the marker threshold value or more, or, the size of the marker 30 photographed in the photographed image has varied from the marker threshold value or more to less than the marker threshold value, the client device 100 transmits, for example, article storage information and the photographed images to the server device 200. In this embodiment, the storage location marker 12 is used for comparison with the marker threshold value. The marker threshold value is set to "200." The size of the marker is represented by a length of its diagonal line. A unit of the size of the marker is conveniently determined.

The closer the client device 100 is to the shelf 10, the larger the storage location marker 12 photographed in the photographed image photographed by the client device 100 becomes.

Here, a proximity region 50 indicated in FIG. 4A to FIG. 4D will be described. The proximity region 50 is a region set in front of the shelf 10. When the client device 100 is located inside the proximity region 50, the size of the storage location marker 12 photographed in the photographed image photographed by the client device 100 becomes the marker threshold value or more. When the client device 100 is located outside the proximity region 50, the size of the storage location marker 12 photographed in the photographed image photographed by the client device 100 becomes less than the marker threshold value.

When the client device 100 enters the proximity region 50 from outside the proximity region 50, the size of the storage location marker 12 photographed in the photographed image varies from less than the marker threshold value to the marker threshold value or more. When the client device 100 goes out of the proximity region 50 from inside the proximity region 50, the size of the storage location marker 12 photographed in the photographed image varies from the marker threshold value or more to less than the marker threshold value. In these cases, the client device 100 transmits, for example, article storage information and the photographed images to the server device 200. The article storage information is information that represents a location where the article 20 is stored.

In positions 40A, 40B, and 40C in FIG. 4A to FIG. 4D, the position 40A is farthest from the shelf 10, and the position 40C is closest to the shelf 10. The position 40B is a position between the position 40A and the position 40C. The position 40A and the position 40B are outside the proximity region 50. The position 40C is inside the proximity region 50. The size of the storage location marker 12 photographed in the photographed images 41A, 41F, 41G, and 41L photographed by the client device 100 at the position 40A is "80." The size of the storage location marker 12 photographed in the photographed images 41B, 41E, 41H, and 41K photographed by the client device 100 at the position 40B is "150." The size of the storage location marker 12 photographed in the photographed images 41C, 41D, 41I, and 41J photographed by the client device 100 at the position 40C is "220."

First, with reference to FIG. 4A, a description will be given of an operation of the client device 100 when the forklift 300 loading the article 20 on the fork moves forward toward the shelf 10 to store the article 20 in the storage space 11 in the shelf 10.

While the forklift 300 is moving forward outside the proximity region 50, the size of the storage location marker 12 photographed in the photographed image is always less than the marker threshold value "200." Consequently, the client device 100 does not transmit, for example, the article storage information and the photographed image to the server device 200.

When the forklift 300 enters the proximity region 50 from outside the proximity region 50, the size of the storage location marker 12 photographed in the photographed image varies from less than the marker threshold value to the marker threshold value or more. More specifically, the size of the storage location marker 12 photographed in the photographed image varies from "150" in the photographed image 41B at the position 40B to "220" in the photographed image 41C at the position 40C to be equal to or more than the marker threshold value. Consequently, the client device 100 transmits, for example, the article storage information and the photographed images to the server device 200.

While the forklift 300 is moving forward inside the proximity region 50, the size of the storage location marker 12 photographed in the photographed image is always equal to or more than the marker threshold value "200." Consequently, the client device 100 does not transmit, for example, the article storage information and the photographed images to the server device 200.

Next, with reference to FIG. 4B, a description will be given of an operation of the client device 100 when the forklift 300 that has stored the article 20 in the storage space 11 moves backward from the shelf 10.

While the forklift 300 is moving backward inside the proximity region 50, the size of the storage location marker 12 photographed in the photographed image is always equal to or more than the marker threshold value "200." Consequently, the client device 100 does not transmit, for example, the article storage information and the photographed images to the server device 200.

When the forklift 300 goes out of the proximity region 50 from inside the proximity region 50, the size of the storage location marker 12 photographed in the photographed image varies from the marker threshold value or more to less than the marker threshold value. More specifically, the size of the storage location marker 12 photographed in the photographed image varies from "220" in the photographed image 41D at the position 40C to "150" in the photographed image 41E at the position 40B to be less than the marker threshold value.

Consequently, the client device 100 transmits, for example, the article storage information and the photographed images to the server device 200.

While the forklift 300 is moving backward outside the proximity region 50, the size of the storage location marker 12 photographed in the photographed image is always less than the marker threshold value "200." Consequently, the client device 100 does not transmit, for example, the article storage information and the photographed images to the server device 200.

Figure 4A:
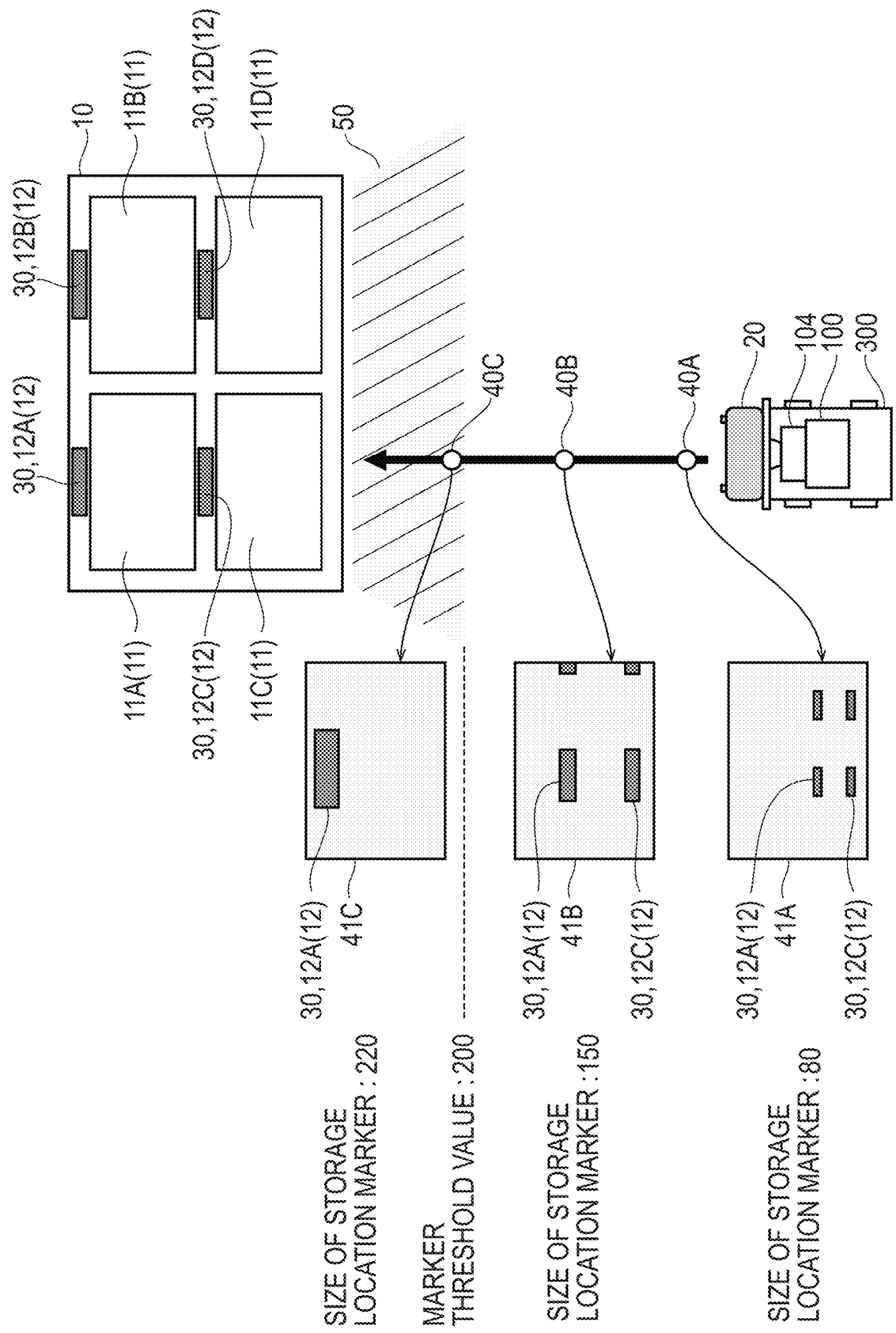
FIG. 4A is a drawing illustrating an operation example of the client device.

FIG. 4C illustrates the operation of the client device 100 when the forklift 300 loading no article 20 on the fork moves forward toward the shelf 10 to remove the article 20 stored in the storage space 11. The operation of the client device 100 in this case is similar to the operation described with reference to FIG. 4A.

Figure 4D:
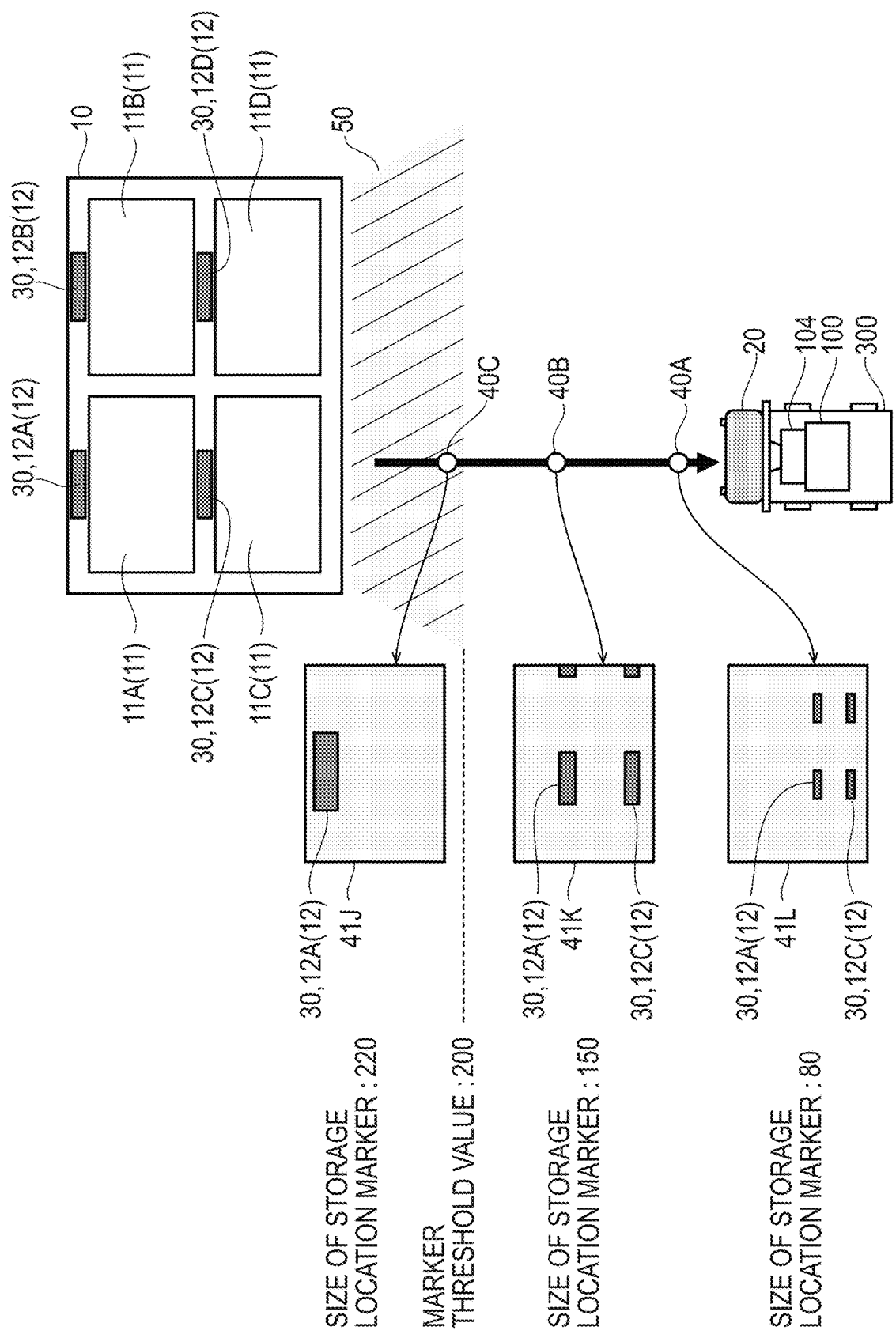
FIG. 4D is a drawing illustrating an operation example of the client device.

FIG. 4D illustrates the operation of the client device 100 when the forklift 300 loading the article 20 on the fork moves backward from the shelf 10 after having removed the article 20 from the storage space 11. The operation of the client device 100 in this case is similar to the operation described with reference to FIG. 4B.

Database or the Like

Figure 3A:
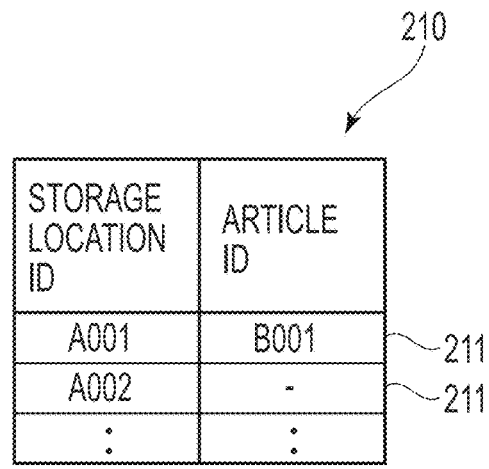
FIG. 3A is a drawing illustrating one example of a configuration of an article management DB.

Next, with reference to FIG. 3A, the article management DB 210 will be described. FIG. 3A is a drawing illustrating one example of the configuration of the article management DB 210. The article management DB 210 is a database that is stored in the storing device 202 of the server device 200. The article management DB 210 manages the storage location of the article 20.

The article management DB 210 can record a plurality of article management records 211. The article management record 211 is information where the storage location ID and the article ID are associated with each other and corresponds to the above-described article storage information. The article management record 211 indicates that the article 20 corresponding to the article ID is stored in the storage space 11 corresponding to the storage location ID. No presence of the article ID associated with the storage location ID indicates that the article 20 is not stored in the storage space 11 corresponding to the storage location ID. A plurality of article IDs may be associated with one storage location ID. In this case, this indicates that a plurality of the articles 20 are stored in the storage space 11.

Figure 3B:
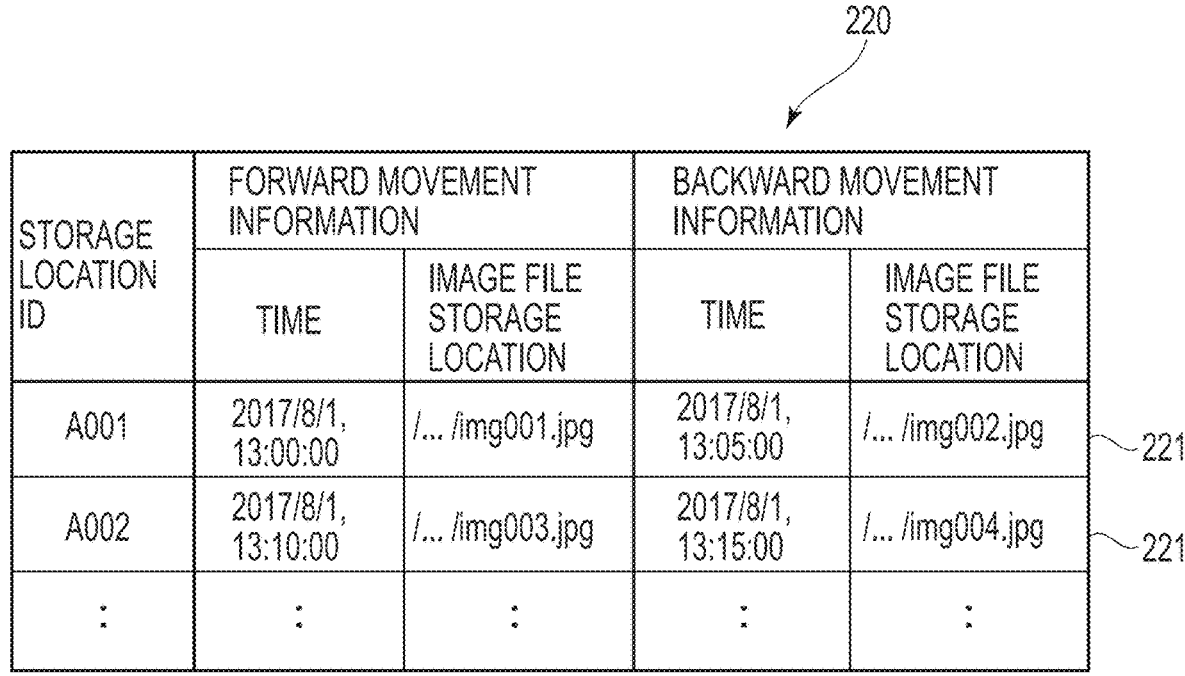
FIG. 3B is a drawing illustrating one example of a configuration of an image management DB.

Next, with reference to FIG. 3B, the image management DB 220 will be described. FIG. 3B is a drawing illustrating one example of the configuration of the image management DB 220. The image management DB 220 is a database stored in the storing device 202 of the server device 200. The image management DB 220 manages the photographed images that the client device 100 has photographed and has photographed the storage space 11.

The image management DB 220 can record a plurality of image management records 221. In one image management record 221, the storage location ID, forward movement information, and the backward movement information are associated with one another.

The forward movement information is information on a forward movement photographed image. The forward movement photographed image is a photographed image when the client device 100 enters the proximity region 50 from outside the proximity region 50. The forward movement information includes time and an image file storage location. The time of the forward movement information is a photographing time of the forward movement photographed image. The forward movement photographed image is stored in the image file area 230. The image file storage location of the forward movement information is represented by a path of the forward movement photographed image and a filename of the forward movement photographed image in the image file area 230.

The backward movement information is information on a backward movement photographed image. The backward movement photographed image is a photographed image when the client device 100 goes out of the proximity region 50 from inside the proximity region 50. The backward movement information includes time and an image file storage location. The time of the backward movement information is a photographing time of the backward movement photographed image. The backward movement photographed image is stored in the image file area 230. The image file storage location of the backward movement information is represented by a path of the backward movement photographed image and a filename of the backward movement photographed image in the image file area 230.

The storage location ID of the image management record 221 indicates that the storage space 11 corresponding to the storage location ID is photographed in the forward movement photographed image and the backward movement photographed image.

Marker Analysis Processing

Figure 5:
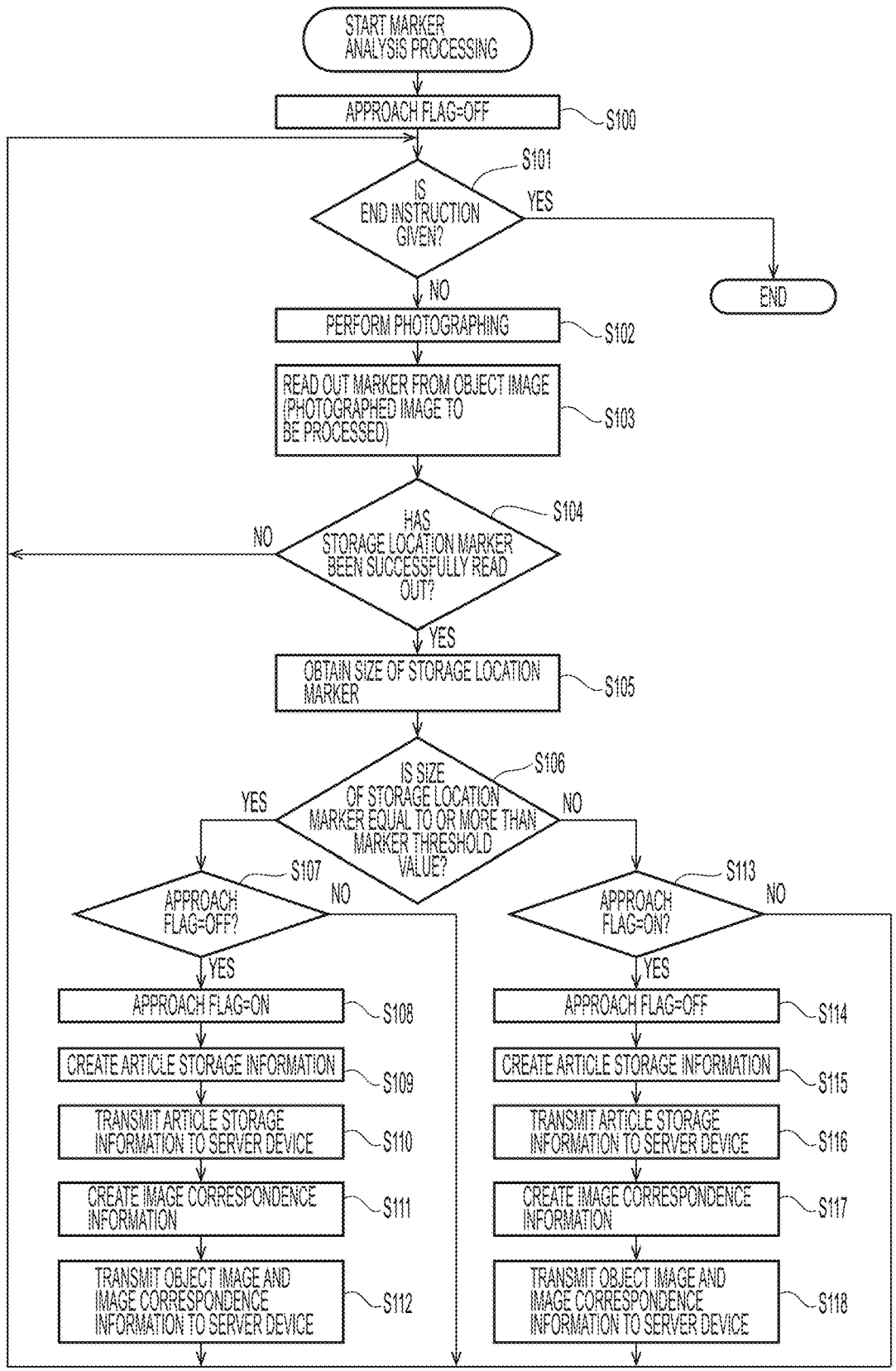
FIG. 5 is a flowchart illustrating one example of marker analysis processing.

Next, with reference to FIG. 5, the marker analysis processing will be described. FIG. 5 is a flowchart illustrating one example of the marker analysis processing.

At Step S100, the CPU 101 of the client device 100 sets an approach flag to OFF as an initial state. The approach flag represents whether the client device 100 resides inside the proximity region 50 or not. Being OFF of the approach flag indicates that the client device 100 resides outside the proximity region 50. Being ON of the approach flag indicates that the client device 100 resides inside the proximity region 50.

At Step S101, the CPU 101 determines whether to end the marker analysis processing or not. For example, when an end instruction is given from, for example, an operator via an operation unit of the client device 100, or when the end instruction is received from the server device 200, the CPU 101 determines to end the marker analysis processing. When the marker analysis processing is determined to end, the CPU 101 ends the marker analysis processing in FIG. 5. When the marker analysis processing is determined not to end, the CPU 101 advances the process to Step S102.

At Step S102, based on the control of the CPU 101, the image sensor 104 performs photographing to generate the photographed image. Until next Step S102 is executed, the CPU 101 sets the photographed image photographed at Step S102 as an object image that is the photographed image to be processed in the marker analysis processing. By repeatedly executing Step S102, the CPU 101 controls the image sensor 104 to continuously perform photographing. The process at Step S102 is one example of photographing control processing.

At Step S103, the CPU 101 reads out all of the markers 30 photographed in the object image, from the object image.

At Step S104, the CPU 101 determines whether the storage location marker 12 has been successfully read out at Step S103 or not. When the storage location marker 12 is determined to have been successfully read out, the CPU 101 advances the process to Step S105, and when the storage location marker 12 is determined not to have been read out, the CPU 101 returns the process to Step S101.

At Step S105, the CPU 101 obtains the size of the storage location marker 12, which has been read out at Step S103, in the object image. As the size of the storage location marker 12 in the object image, the CPU 101 obtains the length of the diagonal line of the storage location marker 12 in the object image.

At Step S106, the CPU 101 obtains the marker threshold value from the storing device 102 of the client device 100. Then, the CPU 101 determines whether the size of the storage location marker 12 obtained at Step S106 is equal to or more than the marker threshold value or not. When the size of the storage location marker 12 obtained at Step S106 is determined to be equal to or more than the marker threshold value, the CPU 101 advances the process to Step S107, and when the size of the storage location marker 12 is determined to be less than the marker threshold value, the CPU 101 advances the process to Step S113. When a plurality of storage location markers 12 are photographed in the object image, the CPU 101 may determine whether the size of the storage location marker 12 is equal to or more than the marker threshold value or not, using any of an average value, a maximum value, and a minimum value of the sizes of the plurality of storage location markers 12.

At Step S107, the CPU 101 determines whether the approach flag is OFF or not. When the approach flag is determined to be OFF, the CPU 101 advances the process to Step S108, and when the approach flag is determined to be ON, the CPU 101 returns the process to Step S101.

The processes at Step S106 and Step S107 are process that determines whether the size of the storage location marker 12 photographed in the photographed image has varied from less than the marker threshold value to the marker threshold value or more. The case where the process proceeds to Step S108 corresponds to the case where the size of the storage location marker 12 photographed in the photographed image is determined to have varied from less than the marker threshold value to the marker threshold value or more.

At Step S108, the CPU 101 sets the approach flag to ON.

At Step S109, based on the marker 30 having been read out from the object image at Step S103, the CPU 101 creates the article storage information representing a combination of the article 20 and the storage space 11 where the article 20 is stored.

More specifically, first, the CPU 101 classifies the marker 30 having been read out from the object image into the storage location marker 12 and the article marker 21.

Next, in the object image, the CPU 101 determines the storage location marker 12 that is positioned closest to the article marker 21 as the storage location marker 12 corresponding to the article marker 21, for each article marker 21.

Then, the CPU 101 creates the article storage information representing a combination of the article marker 21 and the storage location marker 12 corresponding to the article marker 21.

The article storage information is represented by a combination of the article ID stored in the article marker 21 and the storage location ID stored in the storage location marker 12 corresponding to the article marker 21. When the storage location marker 12 is photographed in the object image and the article marker 21 corresponding to the storage location marker 12 does not exist, the CPU 101 creates the article storage information representing that the article ID corresponding to the storage location ID stored in this storage location marker 12 does not exist. When there are a plurality of storage location markers 12, the CPU 101 creates a plurality of pieces of the article storage information.

At Step S110, the CPU 101 transmits the article storage information created at Step S109 to the server device 200 via the communication interface 103. The process of Step S110 is one example of first transmission processing.

The CPU 201 of the server device 200 receives the article storage information from the client device 100 via the communication interface 203. The CPU 201, based on the article storage information received from the client device 100, updates the article management DB 210. More specifically, the CPU 201 controls so as to update the article ID of the article management record 211 that has the storage location ID identical to the storage location ID of the article storage information to the article ID of the article storage information, for each piece of the article storage information received from the client device 100. The process of updating the article management DB 210 is one example of first storing control processing.

At Step S111, the CPU 101, based on the marker 30 having been read out from the object image, creates image correspondence information representing a correspondence relationship between the storage space 11 and the object image. The image correspondence information is information that indicate the storage space 11 photographed in the object image. The image correspondence information is represented by the storage location ID stored in the storage location marker 12 photographed in the object image and information of the object image. The information of the object image includes the photographing time of the object image. When a plurality of storage location markers 12 are photographed in the object image, the CPU 101 creates a plurality of pieces of the image correspondence information.

At Step S112, the CPU 101 transmits the image correspondence information having been created at Step S111 and the object image to the server device 200 via the communication interface 103. The process at Step S112 is one example of second transmission processing.

The CPU 201 of the server device 200 receives the image correspondence information and the object image from the client device 100 via the communication interface 203.

The CPU 201 stores the object image received from the client device 100 into the image file area 230 as the image file. The object image stored here by the CPU 201 is the forward movement photographed image described above. The process of storing the object image is one example of second storing control processing.

The CPU 201, based on the image correspondence information received from the client device 100, updates the image management DB 220. More specifically, the CPU 201 updates the forward movement information of the image management record 221 having the storage location ID identical to the storage location ID of the image correspondence information, for each piece of the image correspondence information received from the client device 100. The time of the forward movement information after the update is photographing time included in the image correspondence information. The image file storage location of the forward movement information after the update is the storage location of the photographed image stored in the image file area 230.

After the process at Step S112, the CPU 101 returns the process to Step S101.

At Step S113, the CPU 101 determines whether the approach flag is ON or not. When the approach flag is determined to be ON, the CPU 101 advances the process to Step S114, and when the approach flag is determined to be OFF, the CPU 101 returns the process to Step S101.

The processes at Step S106 and Step S113 are a process that determines whether the size of the storage location marker 12 photographed in the photographed image has varied from the marker threshold value or more to less than the marker threshold value or not. The case where the process proceeds to Step S114 corresponds to the case where the size of the storage location marker 12 photographed in the photographed image is determined to have varied from the marker threshold value or more to less than the marker threshold value.

At Step S114, the CPU 101 sets the approach flag to OFF.

The processes from Step S115 to Step S118 are similar to the processes from Step S109 to Step S112. However, when receiving the image correspondence information and the object image that the client device 100 has transmitted in the process at Step S118, the CPU 201 of the server device 200 performs the process as follows. The CPU 201 processes the object image as the backward movement photographed image. The CPU 201 updates the backward movement information of the image management record 221, based on the image correspondence information.

Effect

As described above, when the size of the storage location marker 12 photographed in the photographed image has varied from less than the marker threshold value to the marker threshold value or more, or the size of the storage location marker 12 photographed in the photographed image has varied from the marker threshold value or more to less than the marker threshold value, the client device 100 transmits, for example, the article storage information and the photographed image to the server device 200. The server device 200 controls the storing device 202 to store, for example, the article storage information and the photographed image received from the client device 100.

Consequently, the client device 100 avoids transmitting, for example, the article storage information and the photographed image to the server device 200 every time the photographed image is photographed. Therefore, the communication amount between the client device 100 and the server device 200 can be reduced.

In the article management system 1, in creating the article storage information, a special device such as a sensor is not required. Therefore, complicated work such as installation and maintenance of a device such as a sensor can be avoided.

When the size of the storage location marker 12 photographed in the photographed image has varied from less than the marker threshold value to the marker threshold value or more, or the size of the storage location marker 12 photographed in the photographed image has varied from the marker threshold value or more to less than the marker threshold value, the client device 100 transmits the article storage information to the server device 200. The server device 200 controls to store the article storage information received from the client device 100 into the article management DB 210. Therefore, in the article management DB 210, the state of the storage space 11 and the information of the storage space 11 where the article 20 is stored can be maintained in a latest state.

In particular, the client device 100 is mounted in the forklift 300 conveying the article 20. Consequently, when the article 20 is newly stored in the storage space 11, or the article 20 is removed from the storage space 11, the client device 100 photographs the storage space 11. Therefore, in the article management DB 210, the state of the storage space 11 and the information on the storage space 11 where the article 20 is stored can be maintained in the latest state.

When the size of the storage location marker 12 photographed in the photographed image has varied from less than the marker threshold value to the marker threshold value or more, or the size of the storage location marker 12 photographed in the photographed image has varied from the marker threshold value or more to less than the marker threshold value, the client device 100 transmits the object image to the server device 200. The server device 200 stores the object image received from the client device 100 into the image file area 230.

Consequently, an administrator or the like of the article management system 1 can grasp a packaging style by referring to the photographed image stored in the image file area 230. For example, calculating a usage rate for each storage space 11 based on the photographed image stored in the image file area 230 or the like is useful for managing the article 20 or the like. By showing the photographed image stored in the image file area 230 to an operator performing, for example, conveyance of, for example, the article 20, it is possible for the operator to reduce an error, for example, of removing an incorrect article 20.

Second Embodiment

Next, the second embodiment will be described. In the explanation of the second embodiment described below, the explanation of the matters common to the first embodiment will be omitted, and only the matters different from the first embodiment will be explained. Components identical to the first embodiment are given identical reference numerals, and the detail explanation of them will be omitted.

In the first embodiment, the client device 100 uses the storage location marker 12 for comparison with the marker threshold value. However, in the second embodiment, the client device 100 uses a judgement marker for comparison with the marker threshold value. The judgement marker is the marker 30 included in a plurality of the markers 30 photographed in the photographed image photographed in the past and photographed in the photographed image photographed most recently. The process of determining the judgement marker will be described later with reference to FIG. 7. The storage location marker 12 is sometimes used as the judgement marker.

Marker Analysis Processing

Figure 6:
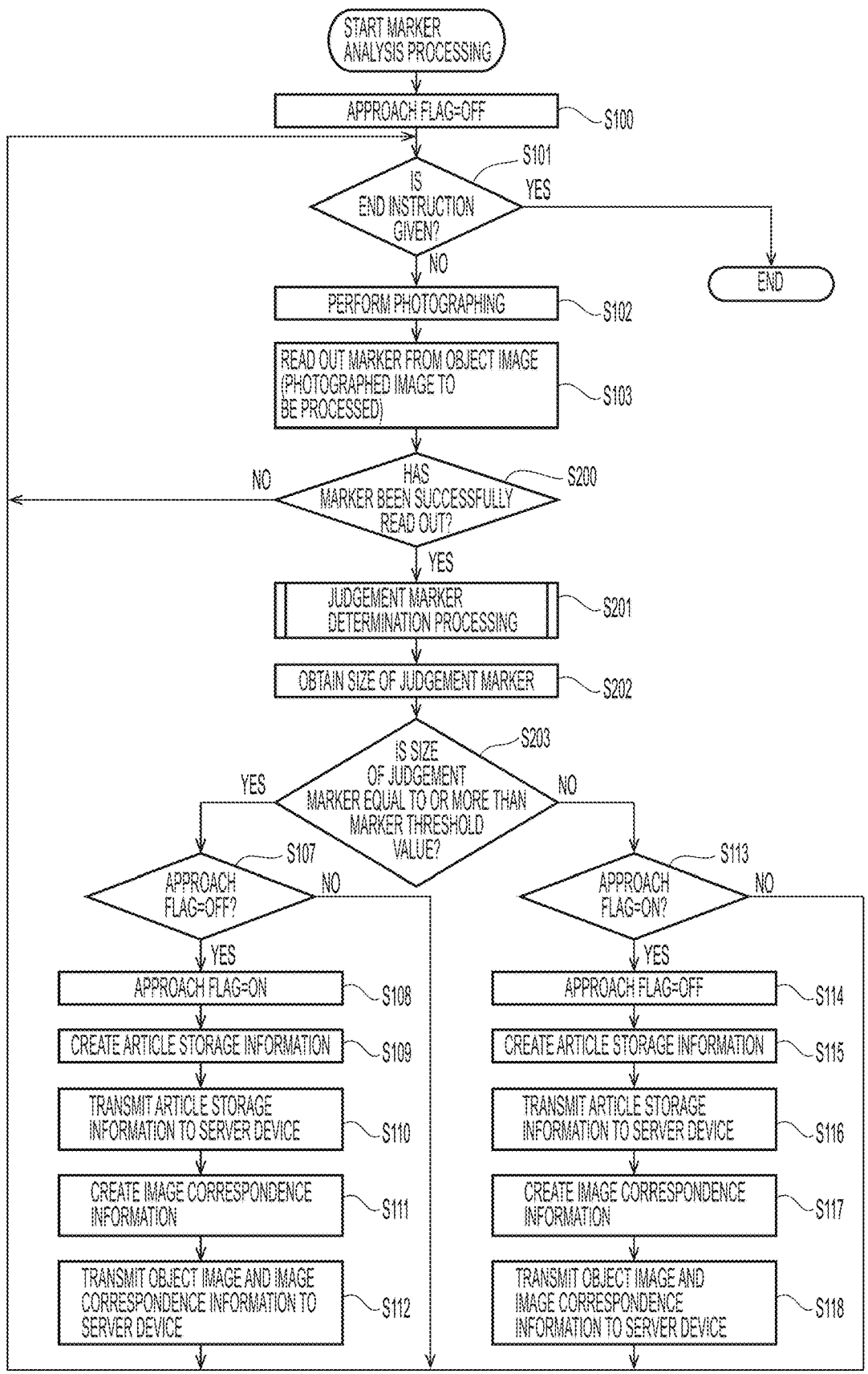
FIG. 6 is a flowchart illustrating one example of marker analysis processing.

First, with reference to FIG. 6, the marker analysis processing of the second embodiment will be described. FIG. 6 is a flowchart illustrating one example of the marker analysis processing. A point of difference between the marker analysis processing in FIG. 6 and the marker analysis processing in FIG. 5 is that the processes from Step S104 to Step S106 in FIG. 5 are replaced with the processes from Step S200 to Step S203. In the following, the processes from Step S200 to Step S203 will be described.

At Step S200, the CPU 101 determines whether the marker 30 has been successfully read at Step S103 out or not. When the marker 30 is determined to have been successfully read out, the CPU 101 advances the process to Step S201, and when the marker 30 is determined not to have been read out, the CPU 101 returns the process to Step S101.

Figure 7:
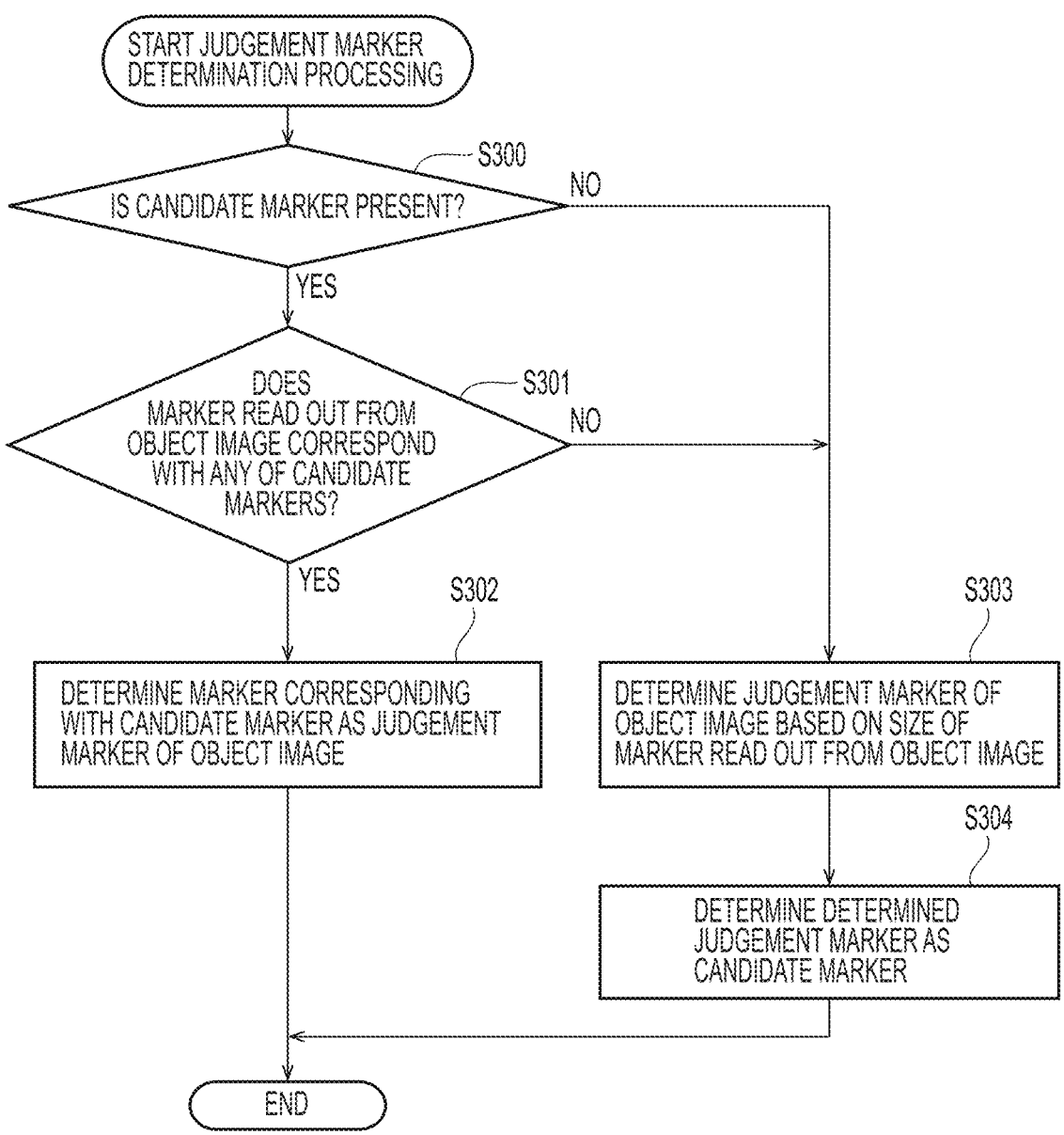
FIG. 7 is a flowchart illustrating one example of judgement marker determination processing.

At Step S201, the CPU 101 executes judgement marker determination processing illustrated in FIG. 7. The specific processing of the judgement marker determination processing will be explained later with reference to FIG. 7.

At Step S202, the CPU 101 obtains the size of the judgement marker in the object image. More specifically, the CPU 101 obtains the length of the diagonal line of the judgement marker in the object image, as the size of the judgement marker in the object image.

At Step S203, the CPU 101 obtains the marker threshold value from the storing device 102 in the client device 100. Then, the CPU 101 determines whether the size of the judgement marker obtained at Step S202 is equal to or more than the marker threshold value or not. When the size of the judgement marker is determined to be equal to or more than the marker threshold value, the CPU 101 advances the process to Step S107, and when the size of the judgement marker is determined to be less than the marker threshold value, the CPU 101 advances the process to Step S113.

Judgement Marker Determination Processing

Next, with reference to FIG. 7, the judgement marker determination processing will be described. FIG. 7 is a flowchart illustrating one example of the judgement marker determination processing.

At Step S300, the CPU 101 determines whether a candidate marker to be a candidate for the judgement marker of the object image is present or not. When the judgement marker determination processing this time is the first judgement marker determination processing after the start of the marker analysis processing in FIG. 6, the candidate marker is determined at Step S304 for the first time, and thus the CPU 101 determines that the candidate marker is not present. When the candidate marker is determined to be present, the CPU 101 advances the process to Step S301, and when the candidate marker is determined not to be present, the CPU 101 advances the process to Step S303.

At Step S301, the CPU 101 determines whether at least one of the markers 30 read out of the object image corresponds with any of the candidate markers or not. When the marker 30 corresponds, it means that the information stored in the marker 30 is equal. For example, when two markers 30 are both the storage location marker 12 and the storage location IDs stored in the two markers 30 are equal, the two markers 30 correspond.

When at least one of the markers 30 is determined to be read out of the object image corresponds with any of the candidate markers, the CPU 101 advances the process to Step S302. When all of the markers 30 read out of the object image do not correspond with any of the candidate markers, the CPU 101 advances the process to Step S303.

At Step S302, the CPU 101 determines the marker 30 that is the marker 30 read out of the object image and corresponds with the candidate marker of a comparison image as the judgement marker of the object image.

At Step S303, based on the respective sizes of the markers 30 read out of the object image, the CPU 101 determines N (N is an integer that is equal to or more than 1) markers 30, where N is a predetermined number, as the judgement marker of the object image. More specifically, from the markers 30 read out of the object image, the CPU 101 determines N (N is an integer that is equal to or more than 1) markers 30, where N is a predetermined number, in descending order of the sizes of the markers 30, as the judgement marker of the object image. The value of N is set in the storing device 102 of the client device 100 and the CPU 101 preliminarily obtains the value of N from the storing device 102. For example, "3" is used as the value of N.

At Step S304, the CPU 101 determines the judgement marker of the object image determined at Step S303 as a new candidate marker. Here, the candidate marker determined by the CPU 101 is used as the candidate marker when the judgement marker determination processing in FIG. 7 is next executed.

After the processes at Step S302 or Step S304, The CPU 101 ends the process in FIG. 7 and advances the process to Step S202 in FIG. 6.

Effect

When N, which is the predetermined number described at Step S303, is set to "2" or more, the client device 100 selects a plurality of candidate markers at Step S304. Consequently, at Step S301 of the next judgement marker determination processing, possibility of being able to determine that at least one of the markers 30 read out of the object image corresponds with any of the candidate markers increases, without comparing all the markers read out of the object image with the candidate markers. Therefore, the judgement marker determination processing is speeded up. However, N may be "1." Similarly to the first embodiment, the second embodiment can also avoid complicated work and reduce the communication amount.

Modification of Second Embodiment

In the second embodiment, the candidate marker is determined at Step S304 in FIG. 7. However, the candidate marker may be preliminarily determined. In this case, the candidate marker is stored in the storing device 102 of the client device 100 and the CPU 101 reads out the candidate marker from the storing device 102.

Other Embodiments

In the above-described embodiments, when the size of the marker 30 has varied from less than the marker threshold value to the marker threshold value or more, or has varied from the marker threshold value or more to less than the marker threshold value, the client device 100 transmits, for example, the article storage information and the photographed images to the server device 200. However, the client device 100 may transmit, for example, the article storage information and the photographed images to the server device 200 only when the size of the marker 30 has varied from less than the marker threshold value to the marker threshold value or more. Furthermore, the client device 100 may transmit, for example, the article storage information and the photographed images to the server device 200 only when the size of the marker 30 has varied from the marker threshold value or more to less than the marker threshold value. This ensures the reduced communication amount between the client device 100 and the server device 200.

Thus, in any embodiment, when the size of the marker 30 photographed in the photographed image is determined to have varied to cross the marker threshold value, the client device 100 transmits, for example, the article storage information and the photographed images to the server device 200. To describe this determination more specifically, in some embodiments, when the size of the marker 30 has varied from less than the marker threshold value to the marker threshold value or more, or has varied from the marker threshold value or more to less than the marker threshold value, the client device 100 determines that the size of the marker 30 photographed in the photographed image has varied to cross the marker threshold value. In another embodiment, the client device 100 determines that the size of the marker 30 photographed in the photographed image has varied to cross the marker threshold value only when the size of the marker 30 has varied from less than the marker threshold value to the marker threshold value or more. In further another embodiment, the client device 100 determines that the size of the marker 30 photographed in the photographed image has varied to cross the marker threshold value only when the size of the marker 30 has varied from the marker threshold value or more to less than the marker threshold value.

In the above-described embodiments, the client device 100 reads out only one kind of marker 30. However, the client device 100 may read out a plurality of kinds of marker 30. In this case, in the processes in FIG. 5 and FIG. 6, when there are a plurality of kinds of marker 30 read out of the object image, the CPU 101 may compare the marker 30 of the kind determined based on predetermined priority information with the marker threshold value.

The priority information is information where the priority-level is determined for each kind of marker 30. In the priority information, the priority-level is set such that the kind of marker 30 having a larger maximum recognition distance has a higher priority-level. The maximum recognition distance is a maximum value of a photographing distance of the photographed image that is a photographed image where the actual marker 30 is photographed by setting a setting regarding photographing of the client device 100 to a predetermined state and satisfies conditions where the client device 100 can read out the marker 30 from the photographed image. This photographing distance is a distance at a time of photographing from the client device 100 to the actual marker 30 attached to, for example, the shelf 10 as a photographic subject. The priority information is stored in the storing device 102 of the client device 100 and the CPU 101 preliminarily obtains the priority information from the storing device 102.

With this, the client device 100 performs comparison with the marker threshold value using the marker 30 that can be read out with high accuracy. Possibility of erroneous determination occurring in comparison with the marker threshold value is reduced.

In the above-described embodiment, the length of the diagonal line of the marker 30 in the photographed image is used as the size of the marker 30. However, the size of the marker 30 may be other than the length of the diagonal line. For example, the size of the marker 30 may be an area of the marker 30 in the photographed image. The size of the marker 30 may be represented by a rate of the size of the marker 30 in the photographed image. More specifically, the size of the marker 30 may be represented by, for example, "(the length of the diagonal line of the marker 30 in the photographed image)/(a length of a long side of the photographed image)," or "(the area of the marker 30 in the photographed image)/(the area of the photographed image)."

In the above-described embodiments, the client device 100 creates the article storage information and the image correspondence information. However, the client device 100 may transmit information, for example, coordinates of the marker 30 in the object image and the information stored in the marker 30 to the server device 200. In this case, the server device 200 may create the article storage information and the image correspondence information based on the information received from the client device 100 and update the article management DB 210 and the image management DB 220 based on the article storage information and the image correspondence information.

In the above-described embodiments, the client device 100 is a photographing unit including the image sensor 104. However, the article management system 1 may have a photographing unit separately from the client device 100. In this case, the photographing unit is provided in the forklift 300 together with the client device 100. Then, at Step S102, the client device 100 receives a photographed image photographed by the photographing unit from the photographing unit.

While the preferred embodiments of the present invention have been described above, the present invention is not limited to such specific embodiments and can be variously varied and modified within a scope of the spirit of the present invention described in the claims. For example, any combination of the above-described embodiments may be executed.

According to the above-described embodiments, complicated work can be avoided and the communication amount can be reduced.

INDUSTRIAL APPLICABILITY

According to the present invention, complicated work can be avoided and the communication amount can be reduced.

The invention claimed is:

1. An information processing system comprising:
a client device provided in a moving body; and
a server device, wherein
the client device includes:
    a photographing controller configured to control a photographing unit provided in the moving body to continuously perform photographing;
    a determination unit configured to determine that a size of a marker photographed in a photographed image has varied to cross a predetermined threshold value when the size of the marker photographed in the photographed image photographed by the photographing unit has varied from less than the threshold value to the threshold value or more, or the size of the marker photographed in the photographed image has varied from the threshold value or more to less than the threshold value; and
    a first transmitter configured to transmit information on the marker photographed in the photographed image to the server device only when the size of the marker photographed in the photographed image photographed by the photographing unit is determined to have varied to cross the threshold value,
the server device includes
    a first storage controller configured to control a storage unit to store the information on the marker transmitted by the first transmitter, and
in at least any of cases where a size of a judgement marker that is a marker included in a plurality of markers photographed in a photographed image photographed in the past by the photographing unit and corresponds with a marker photographed in a photographed image photographed most recently by the photographing unit has varied from less than the threshold value to the threshold value or more, or the size of the judgement marker has varied from the threshold value or more to less than the threshold value, the determination unit determines that the size of the marker photographed in the photographed image has varied to cross the threshold value.

2. The information processing system according to claim 1, wherein
the client device further includes
    a creating unit configured to create article storage information that represents a combination of an article and a storage location where the article is stored as information on a marker based on a marker of an article photographed in the photographed image and a marker of a storage location when the size of the marker photographed in the photographed image is determined to have varied to cross the threshold value,
the first transmitter transmits the article storage information created by the creating unit to the server device when the size of the marker photographed in the photographed image is determined to have varied to cross the threshold value, and the first storage controller controls the storage unit to store the article storage information transmitted by the first transmitter.

3. The information processing system according to claim 1, wherein the client device further includes
a second transmitter configured to transmit the photographed image to the server device when the size of the marker photographed in the photographed image is determined to have varied to cross the threshold value, and the server device further includes
a second storage controller configured to control the storage unit to store the photographed image transmitted by the second transmitter.

4. The information processing system according to claim 1, wherein
the moving body is a forklift.

5. A client device comprising:
a photographing controller configured to control a photographing unit provided in a moving body to continuously perform photographing;
a determination unit configured to determine that a size of a marker photographed in a photographed image has varied to cross a predetermined threshold value when the size of the marker photographed in the photographed image photographed by the photographing unit has varied from less than the threshold value to the threshold value or more, or the size of the marker photographed in the photographed image has varied from the threshold value or more to less than the threshold value; and
a transmitter configured to transmit information on the marker photographed in the photographed image only when the size of the marker photographed in the photographed image photographed by the photographing unit is determined to have varied to cross the threshold value,
wherein in at least any of cases where a size of a judgement marker that is a marker included in a plurality of markers photographed in a photographed image photographed in the past by the photographing unit and corresponds with a marker photographed in a photographed image photographed most recently by the photographing unit has varied from less than the threshold value to the threshold value or more, or the size of the judgement marker has varied from the threshold value or more to less than the threshold value, the determination unit determines that the size of the marker photographed in the photographed image has varied to cross the threshold value.

6. An information processing method in an information processing system including a client device provided in a moving body and a server device, the information processing method comprising:
a photographing controlling step of controlling a photographing unit provided in the moving body to continuously perform photographing by the client device;
a determination step of determining that a size of a marker photographed in a photographed image has varied to cross a predetermined threshold value when the size of the marker photographed in the photographed image photographed by the photographing unit has varied from less than the threshold value to the threshold value or more, or the size of the marker photographed in the photographed image has varied from the threshold value or more to less than the threshold value;
a transmitting step of transmitting information on the marker photographed in the photographed image to the server device by the client device only when the size of the marker photographed in the photographed image photographed by the photographing unit is determined to have varied to cross the threshold value; and
a storing control step of controlling a storage unit by the server device to store the information on the marker transmitted by the transmitting step of transmitting,
wherein in at least any of cases where a size of a judgement marker that is a marker included in a plurality of markers photographed in a photographed image photographed in the past by the photographing unit and corresponds with a marker photographed in a photographed image photographed most recently by the photographing unit has varied from less than the threshold value to the threshold value or more, or the size of the judgement marker has varied from the threshold value or more to less than the threshold value, the determination step determines that the size of the marker photographed in the photographed image has varied to cross the threshold value.

7. A non-transitory computer readable recording medium with a program causing a computer to execute:
a photographing controlling step of controlling a photographing unit provided in a moving body to continuously perform photographing;
a determination step of determining that a size of a marker photographed in a photographed image has varied to cross a predetermined threshold value when the size of the marker photographed in the photographed image photographed by the photographing unit has varied from less than the threshold value to the threshold value or more, or the size of the marker photographed in the photographed image has varied from the threshold value or more to less than the threshold value; and
a transmitting step of transmitting information on the marker photographed in the photographed image only when the size of the marker photographed in the photographed image photographed by the photographing unit is determined to have varied to cross the threshold value,
wherein in at least any of cases where a size of a judgement marker that is a marker included in a plurality of markers photographed in a photographed image photographed in the past by the photographing unit and corresponds with a marker photographed in a photographed image photographed most recently by the photographing unit has varied from less than the threshold value to the threshold value or more, or the size of the judgement marker has varied from the threshold value or more to less than the threshold value, the determination step determines that the size of the marker photographed in the photographed image has varied to cross the threshold value.

* * * * *